US012643410B2

(12) United States Patent
Huang et al.

(10) Patent No.: US 12,643,410 B2
(45) Date of Patent: Jun. 2, 2026

(54) ELECTRIC AUXILIARY VEHICLE DEVICE AND OPERATING METHOD THEREOF

(71) Applicant: APh ePower Co., Ltd., Kaohsiung City (TW)

(72) Inventors: Yi-Yun Huang, Kaohsiung City (TW); Hsiu-Hsien Su, Kaohsiung City (TW)

(73) Assignee: APh ePower Co., Ltd., Kaohsiung City (TW)

( * ) Notice: Subject to any disclaimer, the term of this patent is extended or adjusted under 35 U.S.C. 154(b) by 19 days.

(21) Appl. No.: 18/764,196

(22) Filed: Jul. 4, 2024

(65) Prior Publication Data

US 2025/0135897 A1     May 1, 2025

(30) Foreign Application Priority Data

Nov. 1, 2023   (TW) .................................. 112142079

(51) Int. Cl.
B60L 3/12          (2006.01)
(52) U.S. Cl.
CPC .............. B60L 3/12 (2013.01); B60L 2260/52 (2013.01)
(58) Field of Classification Search
CPC ................................ B60L 3/12; B60L 2260/52
See application file for complete search history.

(56) References Cited

U.S. PATENT DOCUMENTS

| | | | | |
|---|---|---|---|---|
| 5,880,677 | A * | 3/1999 | Lestician | G01D 4/004 |
| | | | | 307/17 |
| 7,830,117 | B2 * | 11/2010 | Ambrosio | H02J 7/0019 |
| | | | | 320/109 |
| 8,482,255 | B2 * | 7/2013 | Crombez | H01M 10/44 |
| | | | | 320/132 |
| 8,868,957 | B2 * | 10/2014 | Davis | G06F 1/30 |
| | | | | 713/340 |
| 2010/0235008 | A1 * | 9/2010 | Forbes, Jr. | G06Q 10/00 |
| | | | | 700/297 |
| 2011/0137691 | A1 * | 6/2011 | Johnson | G06Q 10/04 |
| | | | | 715/764 |
| 2012/0239308 | A1 | 9/2012 | Miller et al. | |
| 2015/0158397 | A1 * | 6/2015 | Soto | B60L 15/2009 |
| | | | | 903/903 |

FOREIGN PATENT DOCUMENTS

| | | |
|---|---|---|
| CN | 111348045 | 6/2020 |
| EP | 2599707 | 6/2013 |
| JP | 2013025432 | 2/2013 |
| TW | I801236 | 5/2023 |

OTHER PUBLICATIONS

"Office Action of Taiwan Counterpart Application", issued on Aug. 16, 2024, p. 1-p. 9.
"Search Report of Europe Counterpart Application", issued on Apr. 7, 2025, p. 1-p. 12.

* cited by examiner

*Primary Examiner* — Gertrude Arthur Jeanglaude
(74) *Attorney, Agent, or Firm* — JCIPRNET

(57)          ABSTRACT

An electric auxiliary vehicle device and an operating method thereof are provided. An electric energy monitoring unit monitors an electric energy consumption and a charging amount of the electric auxiliary vehicle device. A processing circuit calculates a carbon emission and a carbon reduction based on the electric energy consumption and the charging amount of the electric auxiliary vehicle device, and generates a statistical data. A storage circuit stores the carbon emissions, the carbon reductions and the statistical data.

14 Claims, 3 Drawing Sheets

100

100

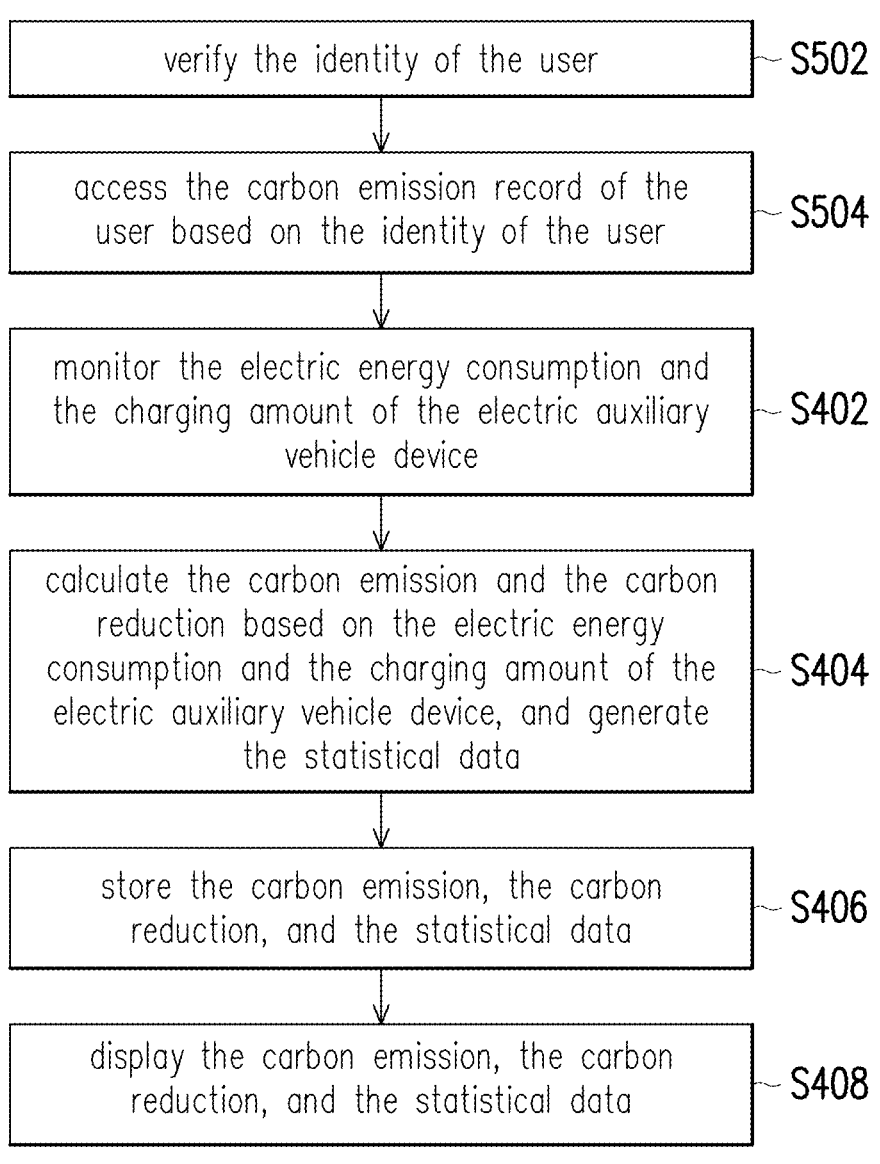

verify the identity of the user ～S502 access the carbon emission record of the user based on the identity of the user ～S504 monitor the electric energy consumption and the charging amount of the electric auxiliary vehicle device ～S402 calculate the carbon emission and the carbon reduction based on the electric energy consumption and the charging amount of the electric auxiliary vehicle device, and generate the statistical data ～S404 store the carbon emission, the carbon reduction, and the statistical data ～S406 display the carbon emission, the carbon reduction, and the statistical data ～S408

FIG. 5

ELECTRIC AUXILIARY VEHICLE DEVICE AND OPERATING METHOD THEREOF

CROSS-REFERENCE TO RELATED APPLICATION

This application claims the priority benefit of Taiwan application serial no. 112142079, filed on Nov. 1, 2023. The entirety of the above-mentioned patent application is hereby incorporated by reference herein and made a part of this specification.

BACKGROUND

Technical Field

The disclosure relates to an electronic device, and in particular to an electric auxiliary vehicle device and an operating method thereof.

Description of Related Art

Nowadays, environmental awareness is increasing day by day, and environmentally friendly means of transportation such as electric auxiliary vehicles are widely used. However, the current calculation and statistical methods for the carbon emissions generated by electric auxiliary vehicles during operation and the carbon emissions saved when recharging energy are not yet perfect, and users cannot accurately know the actual carbon emission state or carbon reduction state of electric auxiliary vehicles, so the carbon emissions of electric auxiliary vehicles cannot be effectively controlled.

SUMMARY

The disclosure provides an electric auxiliary vehicle device and an operating method thereof, which can accurately provide users with carbon emissions, carbon reductions, and related statistical data of the electric auxiliary vehicle, and help users achieve expected carbon reduction goals.

An electric auxiliary vehicle device of the disclosure includes an electric energy monitoring unit, a processing circuit, and a storage circuit. The electric energy monitoring unit monitors an electric energy consumption and a charging amount of the electric auxiliary vehicle device. The processing circuit is coupled to the electric energy monitoring unit, calculates carbon emissions and carbon reductions based on the electric energy consumption and the charging amount of the electric auxiliary vehicle device, and generates a statistical data. The storage circuit is coupled to the processing circuit to store the carbon emission, the carbon reduction, and the statistical data.

In an embodiment of the disclosure, the electric energy monitoring unit includes a mileage sensor, which is coupled to a processing circuit to sense a traveling mileage of the electric auxiliary vehicle device. The processing circuit calculates the electric energy consumption and the charging amount of the electric auxiliary vehicle device based on the traveling mileage of the electric auxiliary vehicle.

In an embodiment of the disclosure, the electric energy monitoring unit includes a battery power sensor, which is coupled to a processing circuit to sense changes in battery power of the electric auxiliary vehicle device. The processing circuit calculates the carbon emission and the carbon reduction based on the changes in battery power.

In an embodiment of the disclosure, the electric auxiliary vehicle device further includes a verification device coupled to the processing circuit to verify an identity of the user. The processing circuit accesses a carbon emission record of the user based on the identity of the user.

In an embodiment of the disclosure, the electric auxiliary vehicle device further includes a communication unit coupled to the processing circuit. The processing circuit accesses the carbon emission record of the user from a network server or accesses the carbon emission record of the user from the storage circuit through the communication unit.

In an embodiment of the disclosure, the carbon emission is equal to a total electric energy consumption of the electric auxiliary vehicle device multiplied by an energy consumption coefficient of the electric auxiliary vehicle device.

In an embodiment of the disclosure, the carbon reduction is equal to a total recharged amount of the electric auxiliary vehicle device multiplied by the energy consumption coefficient of the electric auxiliary vehicle device.

The disclosure also provides an operating method of an electric auxiliary vehicle device, which includes the following steps. The electric energy consumption and the charging amount of the electric auxiliary vehicle device are monitored. The carbon emission and the carbon reduction are calculated based on the electric energy consumption and the charging amount of the electric auxiliary vehicle device, and the statistical data is generated. The carbon emission, the carbon reduction, and the statistical data are stored. The carbon emission, the carbon reduction, and the statistical data are displayed.

In an embodiment of the disclosure, the operating method of the electric auxiliary vehicle device includes sensing the traveling mileage of the electric auxiliary vehicle device, and calculating the electric energy consumption or the charging amount of the electric auxiliary vehicle device based on the traveling mileage of the electric auxiliary vehicle device.

In an embodiment of the disclosure, the operating method of the electric auxiliary vehicle device includes sensing an input power and an output power of the battery of the electric auxiliary vehicle device, and calculating the electric energy consumption or the charging amount of the electric auxiliary vehicle device based on the input power and the output power of the battery.

In an embodiment of the disclosure, the operation method of the electric auxiliary vehicle device includes verifying the identity of the user, and accessing the carbon emission record of the user based on the identity of the user.

In an embodiment of the disclosure, the operating method of the electric auxiliary vehicle device includes accessing the carbon emission record of the user from the network server or accessing the carbon emission record of the user from the storage circuit of the electric auxiliary vehicle device.

In an embodiment of the disclosure, the carbon emission is equal to the total electric energy consumption of the electric auxiliary vehicle device multiplied by the energy consumption coefficient of the electric auxiliary vehicle device.

In an embodiment of the disclosure, the carbon reduction is equal to the total recharged amount of the electric auxiliary vehicle device multiplied by the energy consumption coefficient of the electric auxiliary vehicle device.

Based on the above, the processing circuit of the embodiment of the disclosure may accurately calculate the carbon emissions and the carbon reductions based on the electric energy consumption and the charging amount of the electric auxiliary vehicle device, and generate the statistical data. In this way, the carbon emissions, the carbon reduction, and the statistical data of the electric auxiliary vehicle device are accurately provided, which may help users accurately know the actual carbon emission status or carbon reduction status of the electric auxiliary vehicle device, thereby changing the driving method of the electric auxiliary vehicle device accordingly to achieve the expected carbon reduction goals.

To make the aforementioned more comprehensible, several embodiments accompanied with drawings are described in detail as follows.

BRIEF DESCRIPTION OF THE DRAWINGS

FIG. 5 is a flow chart of an operating method of an electric auxiliary vehicle device according to another embodiment of the disclosure.

DESCRIPTION OF THE EMBODIMENTS

Figure 1:
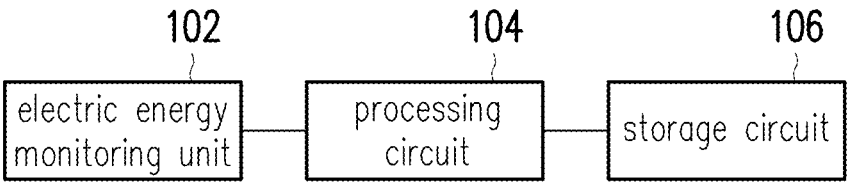
FIG. 1 is a schematic diagram of an electric auxiliary vehicle device according to an embodiment of the disclosure.

FIG. 1 is a schematic diagram of an electric auxiliary vehicle device according to an embodiment of the disclosure. Refer to FIG. 1, an electric auxiliary vehicle device 100 may be, for example, a bicycle that may be driven by an electric motor or driven by pedaling by a user, but is not limited thereto. When the user drives the electric auxiliary vehicle device 100 by pedaling, a kinetic energy of the pedaling may be converted into an electric energy (for example, the kinetic energy is converted into the electric energy through electromagnetic induction) to charge a battery of the electric auxiliary vehicle device 100. The electric auxiliary vehicle device 100 may include an electric energy monitoring unit 102, a processing circuit 104, and a storage circuit 106. The processing circuit 104 is coupled to the electric energy monitoring unit 102 and the storage circuit 106. The processing circuit 104 may be implemented by, for example, a processor or a microcontroller. The storage circuit 106 may be implemented by, for example, a non-volatile memory, but is not limited thereto. The electric energy monitoring unit 102 is used to monitor an electric energy consumption and a charging amount of the electric auxiliary vehicle device 100. The processing circuit 104 calculates a carbon emission and a carbon reduction based on the electric energy consumption and the charging amount of the electric auxiliary vehicle device 100, and generates a statistical data. The statistical data may include, for example, the electric energy consumption and the charging amount in different periods, as well as a total amount of the carbon emissions and the carbon reductions in each of the periods, but is not limited thereto. The storage circuit 106 may store the carbon emissions, the carbon reductions, and the statistical data calculated by the processing circuit 104 for access by the user.

Figure 2:
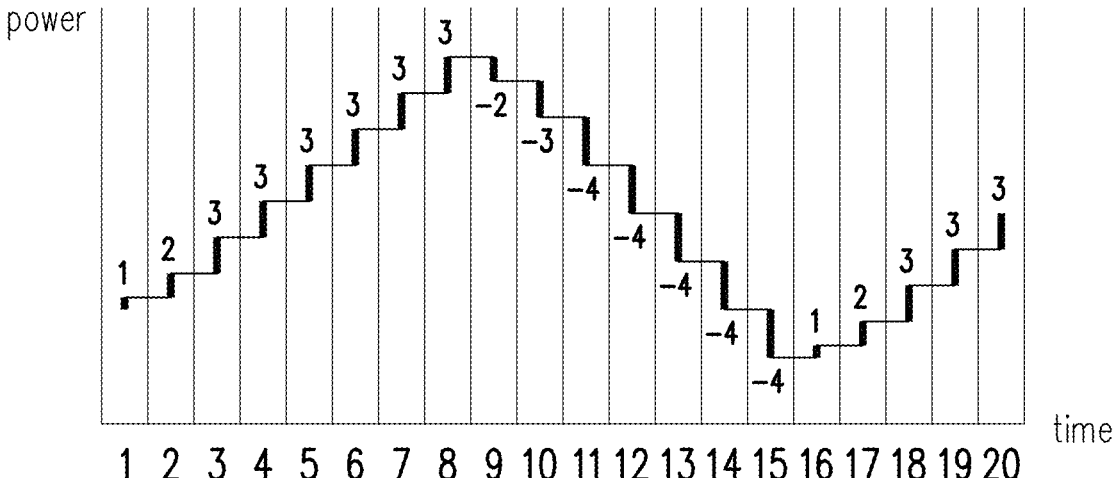
FIG. 2 is a schematic diagram of an electric energy consumption and an electric energy recharged amount of an electric auxiliary vehicle device according to an embodiment of the disclosure.

Furthermore, the way of calculating the electric energy consumption of the electric auxiliary vehicle device 100 may be, for example, multiplying an output power of the battery of the electric auxiliary vehicle device 100 by a time the battery provides the electric energy. The way of calculating the charging amount of the electric auxiliary vehicle device 100 may be, for example, multiplying an input power provided to the battery when the user performs a pedaling operation by a time the user performs the pedaling operation. The statistical data generated by the processing circuit 104 based on the electric energy consumption and the charging amount of the electric auxiliary vehicle device 100 may be shown in FIG. 2. In the embodiment of FIG. 2, during periods 1 to 8 and 16 to 20, the electric auxiliary vehicle device 100 is in a manual driving mode, the user performs the pedaling operation to drive the electric auxiliary vehicle device 100 and charge the battery of the electric auxiliary vehicle device 100. An electric energy of battery increases by 1% in period 1, and the electric energy of battery increases by 2% in period 2, and so on. During the periods 9 to 15, the electric auxiliary vehicle device 100 is in an electric energy driving mode, and the electric motor of the electric auxiliary vehicle device 100 drives the electric auxiliary vehicle device 100 by consuming the electric energy of battery. The electric energy of battery drops by 2% in period 9, and the electric energy of battery drops by 3% in period 2, and so on.

In addition, the away of calculating the carbon emissions of the electric auxiliary vehicle device 100 may be, for example, multiplying a total electric energy consumption (kWh) of the electric auxiliary vehicle device 100 by an energy consumption coefficient (kg CO2/kWh), which represents the carbon emissions caused by driving the electric auxiliary vehicle device 100 with the electric energy of battery. The energy consumption coefficient is an electricity carbon emission coefficient. The way of calculating the carbon reduction of the electric auxiliary vehicle device 100 may be, for example, multiplying a total recharged amount (kWh) of the electric auxiliary vehicle device 100 by the energy consumption coefficient (kg CO2/kWh), which represents a carbon offset due to the electricity energy recycled through the pedaling operation of the user.

In this way, the carbon emissions, the carbon reductions, and the statistical data of the electric auxiliary vehicle are accurately provided based on the electric energy consumption and charging amount of the electric auxiliary vehicle device, which can effectively help users evaluate the carbon emissions generated to the environment caused by riding the electric auxiliary vehicle device, thereby controlling the electric auxiliary vehicle device to achieve expected carbon reduction goals.

In some embodiments, the carbon offset accumulated by the electric auxiliary vehicle device 100 may be applied to user rewards of the electric auxiliary vehicle device 100. For example, when the total recharged amount is greater than the total electric energy consumption, that is, the carbon offset is greater than the carbon emission, users may be given accumulated points to exchange for goods or services as rewards, but is not limited thereto. In this way, establishing a reward system by using recorded carbon emissions and carbon reductions as evaluation standards can encourage users to participate in environmental protection actions and jointly promote low-carbon travel. In addition, the electric auxiliary vehicle device 100 may be sent to a power supply station to provide the saved electric energy for regional power supply to realize effective reuse of energy.

Figure 3:
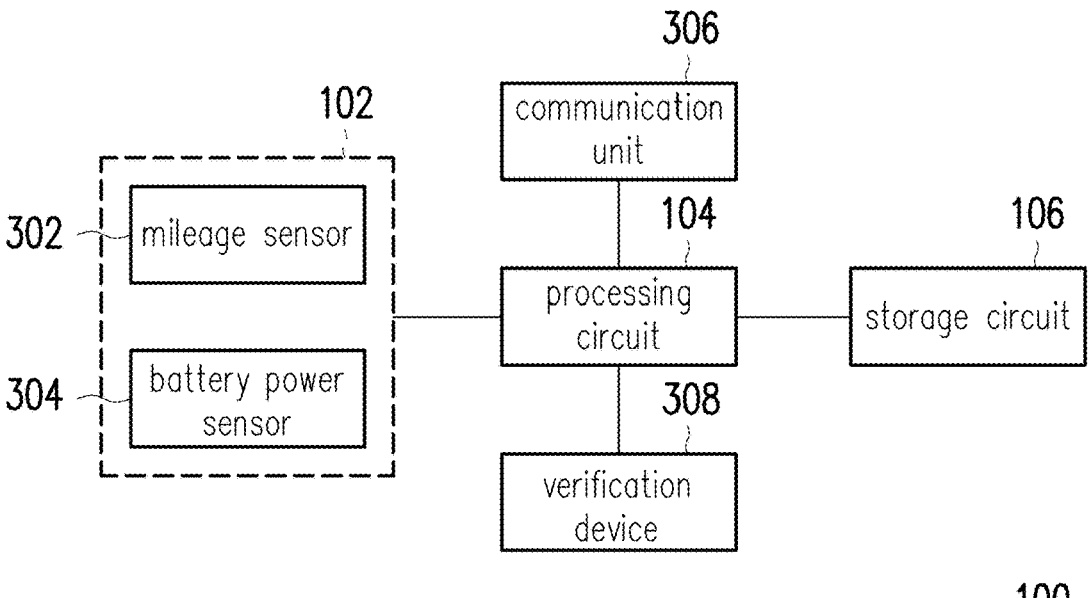
FIG. 3 is a schematic diagram of an electric auxiliary vehicle device according to another embodiment of the disclosure.

FIG. 3 is a schematic diagram of an electric auxiliary vehicle device according to another embodiment of the disclosure. In the embodiment of FIG. 3, the electric energy monitoring unit 102 may include a mileage sensor 302 and a battery power sensor 304. In addition, the electric auxiliary vehicle device 100 may further include a communication unit 306 and a verification device 308. The communication unit 306 and the verification device 308 are coupled to the processing circuit 104. The mileage sensor 302 may be used to sense a traveling mileage of the electric auxiliary vehicle device. The processing circuit 104 calculates the electric energy consumption or the charging amount of the electric auxiliary vehicle device 100 based on the traveling mileage of the electric auxiliary vehicle device 100, thereby obtaining changes in battery power. For example, in the electric energy driving mode, the electric energy consumption of the electric auxiliary vehicle device 100 is calculated based on the traveling mileage of the electric auxiliary vehicle device 100. In the manual driving mode, the charging amount of the electric auxiliary vehicle device 100 is calculated based on the traveling mileage of the electric auxiliary vehicle device 100. The battery power sensor 304 may sense the input power and the output power of the battery of the electric auxiliary vehicle device 100 to obtain the changes in battery power of the electric auxiliary vehicle device 100. The processing circuit 104 may calculate the carbon emissions and the carbon reductions based on the changes in battery power of the electric auxiliary vehicle device 100. In this embodiment, although the electric energy monitoring unit 102 includes both the mileage sensor 302 and the battery power sensor 304, in other embodiments, the electric energy monitoring unit 102 may only include one of the mileage sensor 302 and the battery power sensor 304 to sense the changes in battery power of the electric auxiliary vehicle device 100.

In addition, the verification device 308 may be used to verify an identity of the user, which may be, for example, a fingerprint sensor, but is not limited thereto. After the user passes identity verification, the processing circuit 104 may access a carbon emission record of the user according to the identity of the user. For example, the carbon emission record of the user is accessed from the storage circuit 106, which allows the user to further understand the historical records of the carbon emissions.

The communication unit 306 may be used to perform wireless communication with other devices, which may be, for example, chips or circuits of wireless communication protocols supporting Wi-Fi, third-Generation (3G), fourth-Generation (4G), Global System for Mobile Communications, and Bluetooth (BLE). In addition to accessing the carbon emission record of the user from the storage circuit 106, the processing circuit 104 may also access the carbon emission record of the user from a network server through the communication unit 306. In addition, the communication unit 306 may also be connected to a mobile phone of the user, so that the user may obtain the data stored in the storage circuit 106 by operating an application software (APP) corresponding to the electric auxiliary vehicle device 100 in the mobile phone. In some embodiments, the electric auxiliary vehicle device 100 may also include a display device to directly display the data stored in the storage circuit 106, such as the carbon emissions, the carbon reductions, and the statistical data.

In some embodiments, the processing circuit 104 may also set the carbon reduction goal of the electric auxiliary vehicle device 100, and switch the electric auxiliary vehicle device 100 to the electric energy driving mode or the manual driving mode according to the carbon reduction goal. For example, when the carbon emissions of the electric auxiliary vehicle device 100 are greater than a threshold set by the carbon reduction goal, the processing circuit 104 may switch the electric auxiliary vehicle device 100 to the manual driving mode to control the carbon emissions of the electric auxiliary vehicle device 100 to be lower than the carbon reduction goal.

Figure 4:
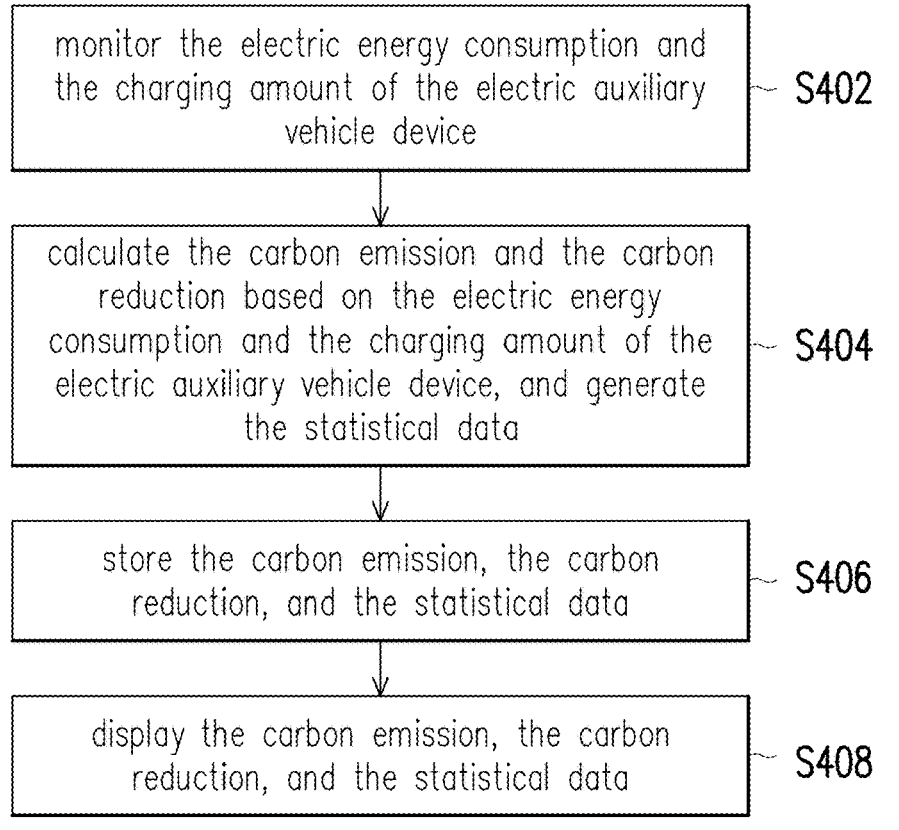
FIG. 4 is a flow chart of an operating method of an electric auxiliary vehicle device according to an embodiment of the disclosure.

FIG. 4 is a flow chart of an operating method of an electric auxiliary vehicle device according to an embodiment of the disclosure. It may be seen from the embodiments that the operating method of the electric auxiliary vehicle device may include the following steps. First, the electric energy consumption and the charging amount of the electric auxiliary vehicle device are monitored (step S402). The electric energy consumption and the charging amount of the electric auxiliary vehicle device may be obtained, for example, by sensing the traveling mileage of the electric auxiliary vehicle device and calculating based on the traveling mileage of the electric auxiliary vehicle device, or by sensing the input power and the output power of the battery of the electric auxiliary vehicle device and calculating the input power and the output power of the battery of the electric auxiliary vehicle device. Next, the carbon emission and the carbon reduction are calculated based on the electric energy consumption and the charging amount of the electric auxiliary vehicle device, and the statistical data is generated (step S404). The carbon emission is equal to the total electric energy consumption of the electric auxiliary vehicle device multiplied by the energy consumption coefficient of the electric auxiliary vehicle device, and the carbon reduction is equal to the total recharged amount of the electric auxiliary vehicle device multiplied by the energy consumption coefficient of the electric auxiliary vehicle device. The statistical data may include, for example, the electric energy consumption and the charging amount in different periods, as well as the total amount of the carbon emissions and the carbon reduction in each of the periods, but is not limited thereto. Then, the carbon emission, the carbon reduction, and the statistical data are stored (step S406). Finally, the carbon emission, the carbon reduction, and the statistical data are displayed (step S408), which maybe directly displayed by the electric auxiliary vehicle device under the circumstance that the electric auxiliary vehicle device has the display device. Alternately, the user may use the mobile phone to access the carbon emission, the carbon reduction, and the statistical data from the electric auxiliary vehicle device and displays on the mobile phone.

FIG. 5 is a flow chart of an operating method of an electric auxiliary vehicle device according to another embodiment of the disclosure. In this embodiment, the operating method of the electric auxiliary vehicle device may also include verifying the identity of the user (step S502), and accessing the carbon emission record of the user based on the identity of the user (step S504). For example, the carbon emission record of the user is accessed from the network server or the carbon emission record of the user is accessed from the storage circuit of the electric auxiliary vehicle device. In this embodiment, the steps S502 and S504 are first executed to verify the identity of the user and access the carbon emission record of the user, and the carbon emission record of the user may be used in the steps S404 to S408 to list the carbon emission record into the statistical data. In other embodiments, the execution order of the steps S502 and S504 is not limited. For example, the steps S502 and S504 may also be executed after the step S406. In this way, the carbon emission record of the user may be displayed together in the step S408, so that the user may obtain the historical record of carbon emissions.

In summary, the processing circuit of the embodiment of the disclosure may accurately calculate the carbon emissions and the carbon reductions based on the electric energy consumption and the charging amount of the electric auxiliary vehicle device, and generate the statistical data. In this way, the carbon emissions, the carbon reduction, and the statistical data of the electric auxiliary vehicle device are accurately provided, which may help users accurately know the actual carbon emission status or carbon reduction status of the electric auxiliary vehicle device, thereby changing the driving method of the electric auxiliary vehicle device accordingly to achieve the expected carbon reduction goals.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An electric auxiliary vehicle device, comprising:
an electric energy monitoring unit, monitoring an electric energy consumption and a charging amount of the electric auxiliary vehicle device;
a processing circuit, coupled to the electric energy monitoring unit, calculating a carbon emission and a carbon reduction based on the electric energy consumption and the charging amount of the electric auxiliary vehicle device, and generating a statistical data; and
a storage circuit, coupled to the processing circuit and storing the carbon emission, the carbon reduction, and the statistical data,
wherein the processing circuit switches the electric auxiliary vehicle device to an electric drive mode or a human drive mode according to a threshold of a carbon reduction target, wherein when the carbon emissions of the electric auxiliary vehicle device are greater than the threshold, the electric auxiliary vehicle device is switched to the human drive mode.

2. The electric auxiliary vehicle device according to claim 1, wherein the electric energy monitoring unit comprises:
a mileage sensor, coupled to the processing circuit to sense a traveling mileage of the electric auxiliary vehicle device, wherein the processing circuit calculates an electric energy consumption or a charging amount of the electric auxiliary vehicle device based on the traveling mileage of the electric auxiliary vehicle device.

3. The electric auxiliary vehicle device according to claim 1, wherein the electric energy monitoring unit comprises:
a battery power sensor, coupled to the processing circuit to sense changes in battery power of the electric auxiliary vehicle device, wherein the processing circuit calculates the carbon emissions and the carbon reduction based on the changes in battery power.

4. The electric auxiliary vehicle device according to claim 1, further comprising:
a verification device, coupled to the processing circuit to verify an identity of an user, wherein the processing circuit accesses a carbon emission record of the user based on the identity of the user.

5. The electric auxiliary vehicle device according to claim 4, further comprising:

a communication unit, coupled to the processing circuit, wherein the processing circuit accesses the carbon emission record of the user from a network server or accesses the carbon emission record of the user from the storage circuit through the communication unit.

6. The electric auxiliary vehicle device according to claim 1, wherein the carbon emission is equal to a total electric energy consumption of the electric auxiliary vehicle device multiplied by an energy consumption coefficient of the electric auxiliary vehicle device.

7. The electric auxiliary vehicle device according to claim 1, wherein the carbon reduction is equal to a total recharged amount of the electric auxiliary vehicle device multiplied by an energy consumption coefficient of the electric auxiliary vehicle device.

8. An operating method of an electric auxiliary vehicle device, comprising:
monitoring an electric energy consumption and a charging amount of the electric auxiliary vehicle device;
calculating a carbon emission and a carbon reduction based on the electric energy consumption and the charging amount of the electric auxiliary vehicle device, and generating a statistical data;
storing the carbon emission, the carbon reduction, and the statistical data;
displaying the carbon emission, the carbon reduction, and the statistical data; and
switching to an electric drive mode or a human drive mode according to a threshold of a carbon reduction target, wherein when the carbon emissions of the electric auxiliary vehicle device are greater than the threshold, the electric auxiliary vehicle device is switched to the human drive mode.

9. The operating method of the electric auxiliary vehicle device according to claim 8, comprising:
sensing a travel mileage of the electric auxiliary vehicle device; and
calculating the electric energy consumption or the charging amount of the electric auxiliary vehicle device based on the traveling mileage of the electric auxiliary vehicle device.

10. The operating method of the electric auxiliary vehicle device according to claim 8, comprising:
sensing an input power and an output power of a battery of the electric auxiliary vehicle device; and
calculating the electric energy consumption and the charging amount of the electric auxiliary vehicle device based on the input power and the output power of the battery.

11. The operating method of the electric auxiliary vehicle device according to claim 8, comprising:
verifying an identity of a user; and
accessing a carbon emission record of the user based on the identity of the user.

12. The operating method of the electric auxiliary vehicle device according to claim 11, comprising:
accessing the carbon emission record of the user from a network server or accessing the carbon emission record of the user from a storage circuit of the electric auxiliary vehicle device.

13. The operating method of the electric auxiliary vehicle device according to claim 8, wherein the carbon emission is equal to a total electric energy consumption of the electric auxiliary vehicle device multiplied by an energy consumption coefficient of the electric auxiliary vehicle device.

14. The operating method of the electric auxiliary vehicle device according to claim 8, wherein the carbon reduction is equal to a total recharged amount of the electric auxiliary vehicle device multiplied by an energy consumption coefficient of the electric auxiliary vehicle device.

* * * * *